United States Patent
Funakubo

(10) Patent No.: US 6,811,477 B2
(45) Date of Patent: Nov. 2, 2004

(54) HANDSAW CAPABLE OF CUTTING GLASS BOTTLE, METHOD FOR MANUFACTURING THE SAME, AND METHOD FOR RE-USING EMPTY WINE BOTTLE

(75) Inventor: Masayoshi Funakubo, Kanagawa (JP)

(73) Assignee: Funasaw Co., Ltd., Tokyo (JP)

( * ) Notice: Subject to any disclaimer, the term of this patent is extended or adjusted under 35 U.S.C. 154(b) by 201 days.

(21) Appl. No.: 09/972,239

(22) Filed: Oct. 9, 2001

(65) Prior Publication Data

US 2002/0040626 A1 Apr. 11, 2002

(30) Foreign Application Priority Data

Oct. 10, 2000 (JP) .......................................... 2000-308833

(51) Int. Cl.$^7$ .............................................. B23D 51/00
(52) U.S. Cl. ........................ 451/524; 30/166.3; 30/357; 451/557
(58) Field of Search ............................... 30/166.3, 357, 30/350; 125/18, 22; 451/524, 525, 557; 51/309

(56) References Cited

U.S. PATENT DOCUMENTS

| 3,626,921 | A | | 12/1971 | Lane |
|---|---|---|---|---|
| 3,630,699 | A | | 12/1971 | Catlin |
| 3,874,126 | A | | 4/1975 | Catlin et al. |
| 3,956,858 | A | | 5/1976 | Catlin et al. |
| 5,524,350 | A | * | 6/1996 | Boland ........................ 30/347 |
| 5,544,643 | A | * | 8/1996 | Bauer et al. .............. 125/22 X |
| 5,975,989 | A | * | 11/1999 | Thiel ..................... 451/524 X |

FOREIGN PATENT DOCUMENTS

FR 2555930 6/1985

OTHER PUBLICATIONS

English Language Abstract of FR 2 555930.

* cited by examiner

*Primary Examiner*—Douglas D Watts
(74) *Attorney, Agent, or Firm*—Greenblum & Bernstein, P.L.C.

(57) ABSTRACT

A handsaw capable of cutting a glass bottle includes a band-like handsaw substrate which is obtained by cutting a steel strip at a predetermined length, a blade portion of hard abrasive applied, by deposition, to at least one edge of the band-like handsaw substrate in the width direction, and a grip portion which allows the band-like handsaw substrate to be manually held. A method for manufacturing a handsaw capable of cutting a glass bottle, and a method for reusing empty wine bottles are also disclosed.

2 Claims, 4 Drawing Sheets ically cut, as a do-it-yourself (DIY) project, the cut bottle can be reused as a flowerpot, for example, wherein the cut bottle is turned upside-down. However, a diamond cutter which is commonly used by a glazier to cut plate glass cannot be used to cut a glass bottle.

HANDSAW CAPABLE OF CUTTING GLASS BOTTLE, METHOD FOR MANUFACTURING THE SAME, AND METHOD FOR RE-USING EMPTY WINE BOTTLE

BACKGROUND OF THE INVENTION

1. Field of the Invention

The present invention relates to a handsaw which can be used to cut glass, such as a glass bottle, a method for manufacturing the same, and a method for re-using an empty wine bottle.

2. Description of the related Art

Wine bottles, come in various colors and designs, having stylish labels, which enhances enjoyment in drinking the wine contained therein. However, since such wine bottles are formed from colored glass provided in a various range of colors, it is difficult to re-use empty wine bottles. As a result, society has to deal with the mounting piles of empty wine bottles which exist at present.

The Life Products Division of the Life Industry Bureau of the Japanese Ministry of International Trade and Industry have proposed recycling empty wine bottles by melting the same to produce 'ecology bottles' wherein various colors of the wine bottles to be recycled do not matter, and also converting the wine bottles into construction material such as roadbed material for roads. However, the fact that there is no guarantee (agreement) that drink/beverage manufacturers will utilize such 'ecology bottles' poses a major problem, and the construction material made from wine bottles is still at the testing and research stage so that it will take a long time before such construction material can be put into practical use. On the other hand, if the bottom portion of a bottle such as a wine bottle, a "sake" bottle, or a cola bottle can be manually cut, as a do-it-yourself (DIY) project, the cut bottle can be reused as a flowerpot, for example, wherein the cut bottle is turned upside-down. However, a diamond cutter which is commonly used by a glazier to cut plate glass cannot be used to cut a glass bottle.

A file-type cutter and a wire-type cutter are also known in the art as a handy glass cutter as an alternative to a diamond cutter. In either cutter, hard abrasive such as diamond abrasive is used. In the file-type cutter, diamond abrasive is applied to a surface of a substrate having a wedge-shaped cross section. In the wire-type cutter, diamond abrasive is applied to a stainless wire. However, in the file-type cutter, it is impossible to deeply cut glass because of the wedge-shaped section (i.e., it is impossible to cut thick glassware, such as a glass bottle), and in the wire-type cutter, it is difficult for a user to exert a strong force on the cutter because the wire is flexible, or it is difficult to cut an object along a straight line. Moreover, the wire of the wire-type is easily broken.

SUMMARY OF THE INVENTION

It is an object of the present invention to provide a handsaw which can be conveniently and easily used to cut glassware of various shapes, such as a glass bottle. Another object of the present invention is to provide a method for manufacturing such a handsaw.

It is another object of the present invention to provide a utilizing method for reusing empty wine bottles without melting the same, and for utilizing the same as a wine bottle planter (e.g., a flower pot).

According to an aspect of the present invention, a handsaw capable of cutting a glass bottle is provided, including a band-like handsaw substrate which is obtained by cutting a steel strip at a predetermined length, a blade portion of hard abrasive applied, by deposition, to at least one edge of the band-like handsaw substrate in the width direction, and a grip portion which allows the band-like handsaw substrate to be manually held.

In an embodiment, the grip portion includes a grip body which covers one end of the band-like handsaw substrate in the length direction thereof, and which is secured to the band-like handsaw substrate.

In an embodiment, the handsaw substrate is provided, on the grip side thereof, with at least two holes, the grip body being split into two halves with respect to a center plane of the thickness of the band-like handsaw substrate, one of the two halves being provided with projections which can be fitted in the corresponding the holes of the band-like handsaw substrate.

In an embodiment, the grip portion is a hacksaw frame to which the ends of the band-like handsaw substrate in the length direction are secured.

According to another aspect of the present invention, a method for manufacturing a handsaw capable of cutting a glass bottle is provided, including cutting a steel strip at a predetermined length to form a band-like handsaw substrate; masking the portion of the band-like handsaw substrate other than a cutter blade forming portion formed on at least one edge of the handsaw substrate in the width direction; applying hard abrasive on the portion of the handsaw substrate other than the masked portion thereof; and dipping the band-like handsaw substrate, to which the hard abrasive has been applied, in an electrolytic solution tank to deposit a metal layer in which the hard abrasive is embedded.

In an embodiment, the method for manufacturing a handsaw further includes securing a grip body to one end of the band-like handsaw substrate in the length direction, upon the band-like handsaw substrate being subjected to the electrolytic deposition.

In an embodiment, the band-like handsaw substrate is provided, on opposite ends thereof, with holes which are adapted to secure the hand saw to a hacksaw frame.

According to another aspect of the present invention, a method for reusing empty wine bottles is provided, the method including cutting a bottom portion of an empty wine bottle, and turning the cut the empty wine bottle upside-down so as to be utilized as a wine bottle planter.

The present disclosure relates to subject matter contained in Japanese Patent Application No.2000-308833 (filed on Oct. 10, 2000) which is expressly incorporated herein by reference in its entirety.

BRIEF DESCRIPTION OF THE DRAWINGS

The present invention will be discussed below in detail, with reference to the accompanying drawings, in which.

DESCRIPTION OF THE PREFERRED EMBODIMENT

Figure 1:
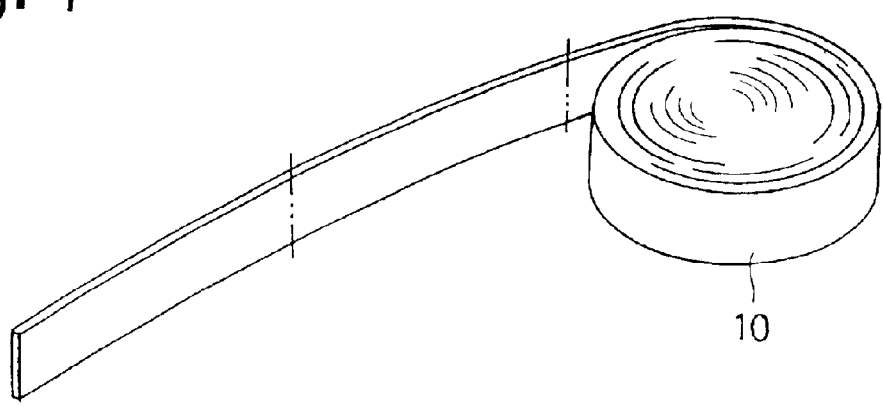
FIG. 1 is a perspective view showing manufacturing processes of a handsaw having a grip body before electrolytic deposition, according to the present invention.
Figure 1:
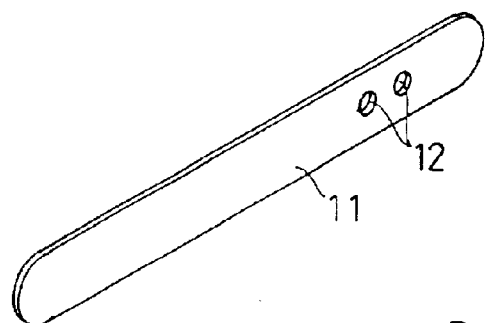
Figure 1:
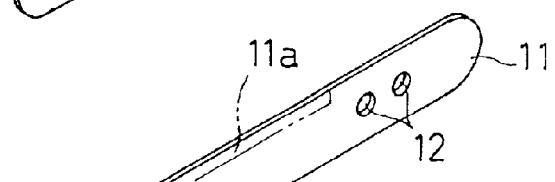
Figure 1:
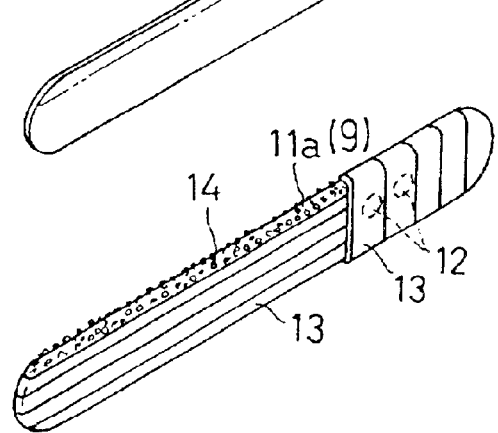

An embodiment of a handsaw capable of cutting a glass bottle and a manufacturing method thereof according to the present invention will be described below. FIGS. 1 through 5 show an embodiment of a handsaw which is provided at one end thereof with a grip body as a holding portion. A band-like handsaw substrate 11 is obtained by cutting a stainless steel strip 10 shown in FIG. 1 at a predetermined length. The ends of the band-like handsaw substrate 11 in the longitudinal direction are preferably rounded or arch-shaped (chamfered). The band-like handsaw substrate 11 is provided on one end thereof with two securing holes 12 which are spaced at an appropriate distance. The stainless steel strip 10 is selected so that the handsaw substrate obtained by cutting the stainless steel strip 10 exhibits appropriate flexibility and hardness as a handsaw.

The portion of the substrate 11 other than the cutter blade forming portion 11a, formed at one side of the substrate in the width direction, is masked with a non-conductive masking tape 13. The end portion of the substrate 11 on the grip side on which the holes 12 are formed is also masked with the non-conductive masking tape. Namely, the substrate 11 is fully masked, with exception to the blade forming portion 11a which is exposed.

After the band-like handsaw substrate 11 is masked with the non-conductive masking tape 13, diamond abrasive 14 is provisionally applied to the cutter blade portion 11a. The provisionally applied diamond abrasive is spread along the edge surface of the cutter blade forming portion 11a and along portions of the front and rear surfaces of the substrate 11 within the cutter blade forming portion 11a. The provisional application of the diamond abrasive can be carried out, for example, by electrolytic plating. The particle size of the diamond abrasive 14 is preferably in the range of approximately 80 to 200 meshes.

Figure 2:
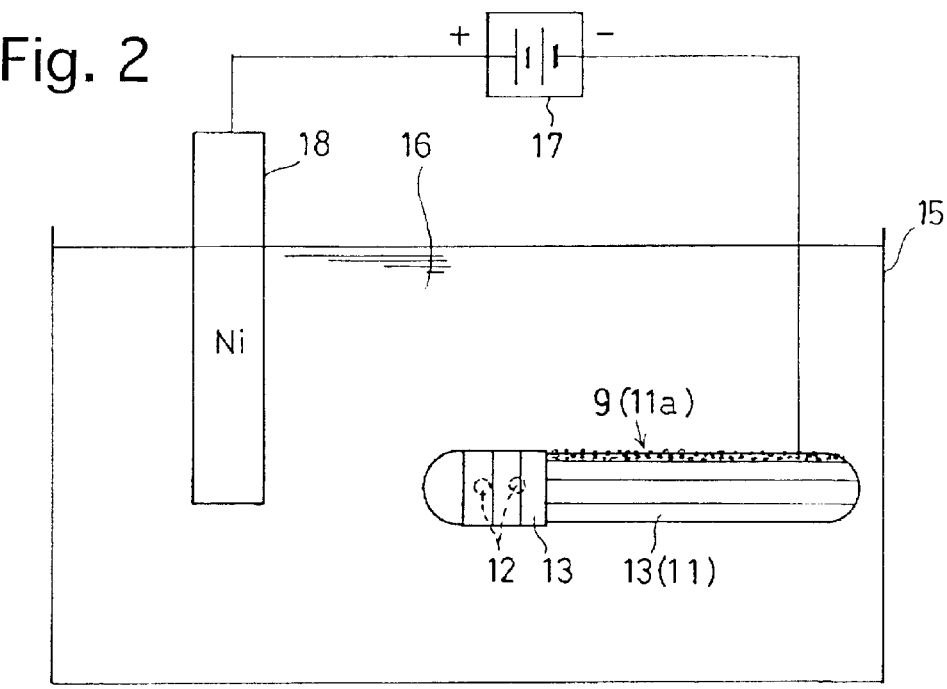
FIG. 2 is a schematic view showing electrolytic deposition of diamond abrasive.
Figure 3:
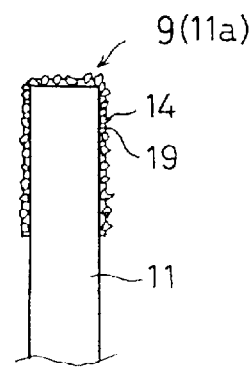
FIG. 3 is a schematic sectional view of a cutter blade forming portion upon electrolytic deposition of diamond abrasive being completed.

The band-like handsaw substrate 11, of which the diamond abrasive is provisionally applied to the cutter blade forming portion 11a, is thereafter dipped in an electrolytic deposition tank (plating tank) 15, as shown in FIG. 2. The electrolytic deposition tank 15 is filled with electrolytic solution (solution of nickel compound such as nickel sulfate) 16. In the electrolytic solution 16, a cathode connected to an external DC power source 17 is connected to the band-like handsaw substrate 11 and an anode is connected to a nickel plate 18. In this state, when electricity is supplied from the DC power source 17, oxidation and reduction occur at the cathode and anode, respectively. Consequently, nickel is electrolytically deposited (plated) on the cutter blade forming portion 11a connected to the cathode. Thus, as shown in FIG. 3, a nickel deposition layer (metal deposition layer) 19 is formed. The formation of the nickel deposition layer 19 causes the diamond abrasive 14 to be firmly embedded in the nickel deposition layer 19. As a result, a blade portion 9 of hard abrasive is deposited in the form of generally u, onto the blade forming portion 11a of the band-like handsaw 11. The electrolytic deposition can be carried out at one time for a number of band-like handsaw substrates 11.

Figure 4:
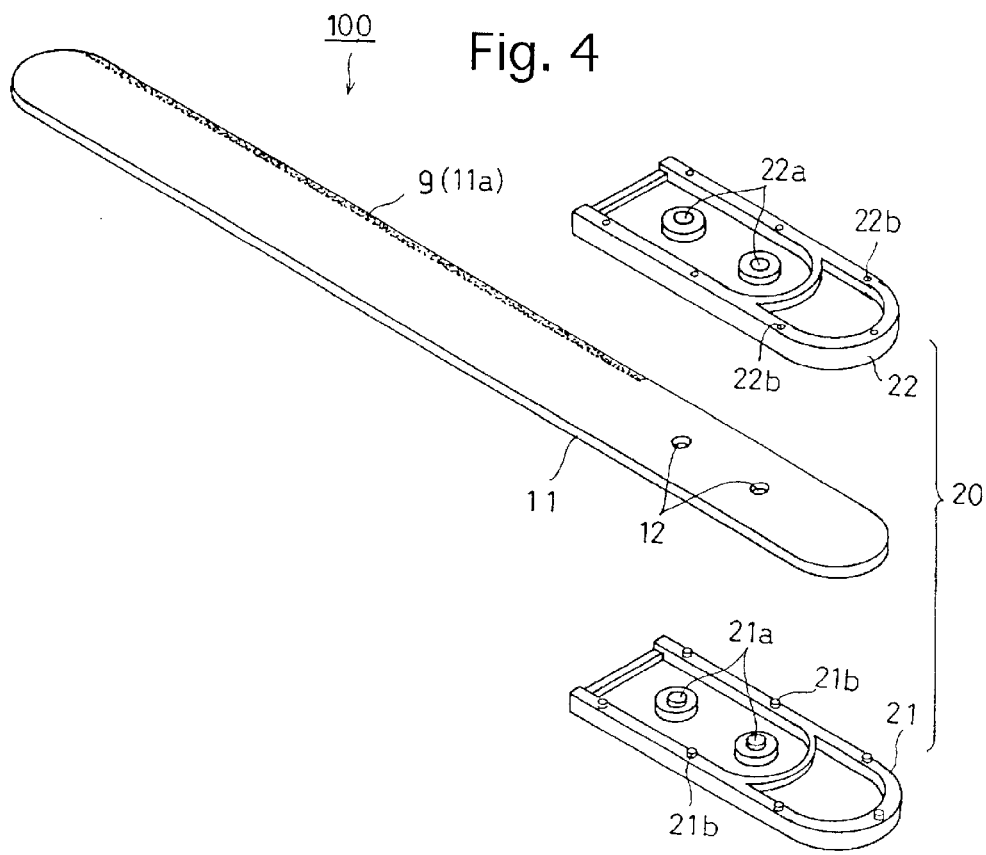
FIG. 4 is a perspective view of a band-like handsaw substrate and a grip portion in a disassembled state, wherein the electrolytic deposition is completed.

A grip body 20 shown in FIG. 4 is formed (or machined) independently of the electrolytic deposition of the band-like handsaw substrate 11. The grip body 20 is made of, for example, synthetic resin, and is constructed from two halves 21 and 22 which are split with respect to a center plane of the thickness of the handsaw substrate 11. The grip half 21 is provided with two securing projections 21a which are fitted in the two holes 12 of the handsaw substrate 11. The other grip half 22 is provided with two receptacles 22a corresponding to the securing projections 21a. The grip halves 21 and 22 are provided, on the peripheral edges thereof, with inter-engageable projections and recesses 21b and 22b, respectively. When the projections 21b and the recesses 22b are engaged, a space is formed between the grip halves in which the end of the handsaw substrate 11 is held. The blade portion 9 of hard abrasive is not provided on the portion of the handsaw substrate 11 that is covered by the grip body 20. The blade portion 9 of hard abrasive may be provided on both edges of the handsaw substrate 11 with respect to the width direction thereof.

The end of the handsaw substrate 11, which has been subjected to the electrolytic deposition, adjacent to the holes 12 is covered by the grip halves 21 and 22 and the projections 21a are fitted in the holes 12. Thereafter, the grip halves 21 and 22 are connected through the inter-engageable projections and recesses 21b and 22b. As a result, a handsaw 100 capable of cutting a glass bottle, having the grip body 20 at one end can be obtained.

Figure 5:
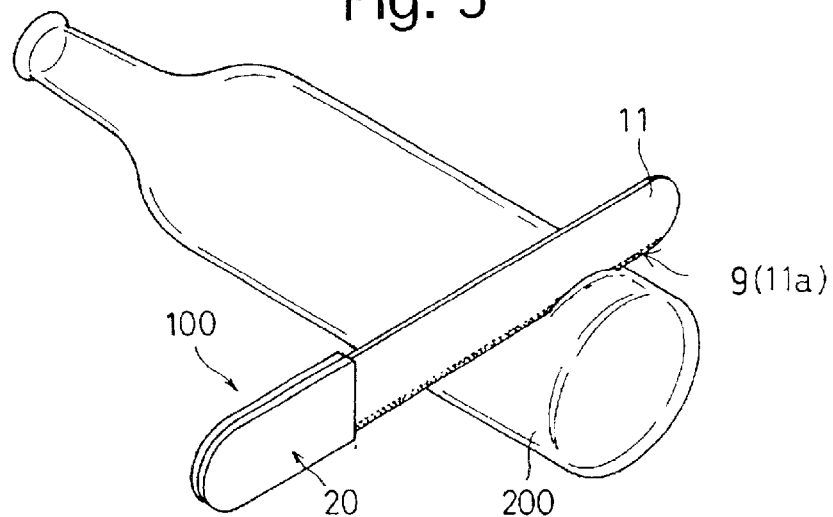
FIG. 5 is a perspective view of an assembled handsaw being used to cut a glass bottle.
Figure 6:
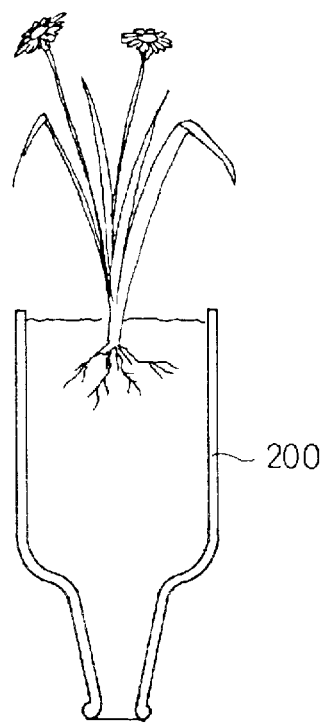
FIG. 6 is a sectional view of a cut glass bottle which is turned upside-down and is reused as a flowerpot.

FIG. 5 shows a cutting operation of a bottom portion of a glass bottle 200 (wine bottle) using the handsaw 100 thus obtained. As shown in FIG. 6, the glass bottle 200 whose bottom has been cut off, can be turned upside-down and be reused, for example, as a flowerpot.

Figure 7:
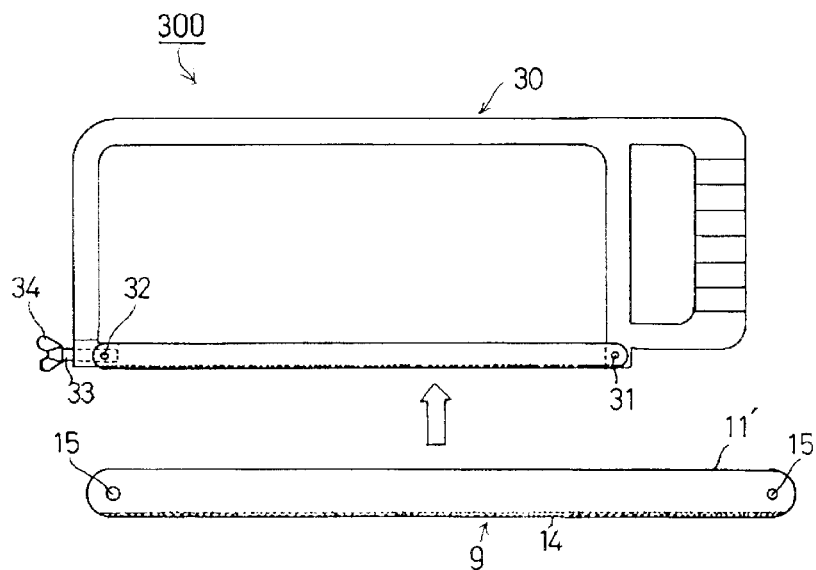
FIG. 7 is a front elevational view of a hacksaw-type handsaw according to the present invention.

FIG. 7 shows an embodiment of a handsaw 300 having a body frame in the form of a hacksaw frame 30. As is well known in the art, the hacksaw frame 30 is generally in the form of a U-shape. The open end of the hacksaw frame is provided with a stationary pin 31 and a movable pin 32. The movable pin 32 is rotatably supported by the front end of a screw rod 33. When the screw rod 33 is moved in the axial direction through a knob 34, the distance between the stationary pin 31 and the movable pin 32 is varied. The handsaw substrate 11' is provided, on its opposite ends in the length direction, with holes 15 in which the stationary pin 31 and the movable pin 32 are fitted. The handsaw substrate 11' is also provided, on one side thereof in the width direction, with a blade portion 9 of hard abrasive, which is formed by electrolytic deposition of diamond abrasive 14 as in the above-described embodiment. The blade portion 9 can be obtained in the same way as that shown in FIG. 2. In the hacksaw, the stationary pin 31 and the movable pin 32 are fitted in the pin holes 15 of the handsaw substrate 11'. Thereafter, when the screw rod 33 is moved in the axial direction, the handsaw substrate 11' is secured to the hacksaw frame 30. Thus, the hacksaw can be used as a handsaw in the same way as the grip-type saw in order to cut, for example, a glass bottle.

Although the metal to be electrolytically deposited on the band-like handsaw substrate 11 is nickel in the illustrated embodiments, it is possible to use other metals, such as copper. Moreover, the electrolytic deposition can be replaced with electroless plating, etc. The diamond abrasive can be replaced with cubic boron nitride (CBN) abrasive, etc.

According to the present invention, not only can the handsaw cut a glass bottle 200 as described above, the handsaw can also be used to cut other objects other than the glass bottle.

As may be understood from the foregoing, according to the present invention, a handsaw capable of cutting a glass bottle for domestic use can be obtained.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A handsaw capable of cutting a glass bottle, comprising:
   a band-like handsaw substrate formed by cutting a steel strip to a predetermined length;
   a blade portion of hard abrasive applied, by deposition, to at least one edge of the band-like handsaw substrate in a width direction; and
   a grip portion which allows the band-like handsaw substrate to be manually held, said grip portion comprises a grip body which covers one end of the band-like handsaw substrate in the length direction thereof, and which is secured to the band-like handsaw substrate,
   wherein said handsaw substrate is provided, on the grip side thereof, with at least two holes, said grip body being split into two halves with respect to a center plane of the thickness of the band-like handsaw substrate, one of the two halves being provided with projections which can fit in the corresponding said holes of the band-like handsaw substrate.

2. The handsaw according to claim 1, wherein said grip portion comprises a hacksaw frame to which the ends of the band-like handsaw substrate in the length direction are secured.

* * * * *